3,048,594
1-ETHYL-2-DIPHENYLMETHYL-PIPERIDINES

Karl Hoffmann, Binningen, and Ernst Sury, Basel, Switzerland, assignors to Ciba Corporation, a corporation of Delaware
No Drawing. Filed Mar. 14, 1960, Ser. No. 14,528
Claims priority, application Switzerland Mar. 22, 1957
9 Claims. (Cl. 260—293)

This invention relates to 1-ethyl-diphenyl-methyl-piperidines, which are substituted in β-position of the ethyl group by a hydroxy group or by a halogen atom, and salts thereof. These compounds may contain further substituents, and in particular the phenyl radicals may contain one or more lower alkyl or alkoxy groups such as methyl, ethyl, methoxy or ethoxy or halogen atoms, such as chloride or bromine. The halogen atom is preferably a chloride atom.

The 1-(β-hydroxyethyl)-2-diphenyl-methyl-piperidines of this invention have a pronounced stimulating effect on the central nervous system and enhance motility. They are useful as medicaments, especially as stimulants. Most important is 1-(β-hydroxyethyl)-2-diphenylmethyl-piperidine and salts thereof. The hydroxyethyl compounds are also useful as starting materials for the corresponding halogenoethyl compounds.

The 1-(β-halogenethyl)-diphenylmethyl-piperidine of this invention have a parasympathiocolytic action. They show antagonism towards acetylcholine, barium chloride, histamine and adrenaline. They can be used as medicaments. Especially important is 1-(β-chlorethyl)-2-diphenylmethyl-piperidine and salts thereof.

The new hydroxyethyl-2-diphenylmethyl-piperidines are obtained by additively combining ethylene oxide at the secondary amino group of a 2-diphenylmethyl-piperidine.

In an analogous manner, the 1-(β-hydroxyethyl)-3- or 4-diphenylmethylpiperidines can be prepared. From the hydroxyethyl compounds the halogenethyl, especially chlorethyl compounds are obtained by exchanging in a manner in itself known the hydroxyl group for a halogen atom, by treating the starting material with a halogenating agent, and preferably a chlorinating agent, such as hydrogen chloride, thionyl chloride, phosphorous pentachloride or the like.

Depending on the procedure used the new compounds are obtained in the form of their bases or salts. From the salts the free piperidine bases can be obtained by methods in themselves known. From the free bases salts can be obtained by reaction with acids which are suitable for the formation of therapeutically useful salts, for example, hydrohalic acids, sulfuric acid, nitric acid, phosphoric acid, acetic acid, propionic acid, oxalic acid, malic acid, citric acid, methane sulfonic acid, ethane sulfonic acid, hydroxyethane sulfonc acid, benzoic acid, salicylic acid, para-aminosalicylic acid or toluene sulfonic acid.

The new compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzyl alcohols, gums, polyalkylene glycols, cholesterol or other known carriers. The pharmaceutical preparations can be in the form for instance of tablets or dragees or in liquid form as solutions, suspensions, or emulsions. They may be sterilized and/or contain auxiliary substances, such as preserving, stabilizing, wetting or emulsifying agents, salts for the modification of osmotic pressure or buffers. They may also contain other therapeutically useful substances. The preparations are obtained in the customary way.

The present application is a continuation-in-part of our applications Ser. No. 718,416 and Ser. No. 718,418, filed March 3, 1958, and both of which are now abandoned.

The following examples illustrate the invention:

Example 1

75 grams of 2-diphenylmethyl-piperidine are dissolved in 150 cc. of alcohol and reacted with 25 grams of ethylene oxide for 24 hours at 20° C. After evaporating the solvent, the substance is distilled in high vacuum. 1-β-hydroxyethyl-2-diphenylmethyl-piperidine melts at 106–107° C. and boils at 180–181° C. under 0.1 mm. of pressure; its hydrochloric prepared by dissolving the compound in ethyl acetate and adding a solution of hydrogen chloride in ethyl acetate melts at 166–167° C. The yield is quantitative.

Example 2

10 grams of 2-(phenyl-para-chlorophenyl-methyl)-piperidine are reacted with 3 grams of ethylene oxide in 50 cc. of alcohol in the manner described in Example 1. 1-β-hydroxyethyl-2-(phenyl-para-chlorophenylmethyl)-piperidine is obtained which boils at 184–187° C. under 0.08 mm. of pressure. Yield=11.5 grams.

Example 3

14 grams of (equals 8.5 cc.) thionyl chloride are slowly added dropwise, while cooling, to 31 grams of 1-β-hydroxyethyl-2-diphenylmethyl-piperidine dissolved in 100 cc. of absolute chloroform. After allowing the mixture to stand overnight, it is evaporated to dryness in vacuo, and the residue is recrystallized, for example, from acetone. The hydrochloride of 1-β-chlorethyl-2-diphenylmethyl-piperidine of the formula

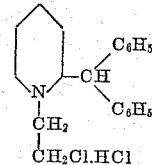

melts at 173–174° C. and is soluble in water. The yield amounts to 28 grams.

Example 4

4.4 grams (equals 2.7 cc.) of thionyl chloride are added dropwise to 11 grams of 1-β-hydroxyethyl-2-(phenyl-para-chlorophenylmethyl)-piperidine, dissolved in 80 cc. of absolute chlorofrom. After allowing the mixture to stand for 16 hours it is evaporated to dryness, whereby the hydrochloride of 1-β-chlorethyl-2-(phenyl-para-chlorophenylmethyl)-piperidine of the formula

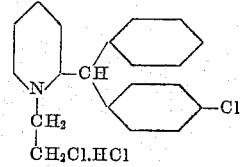

is obtained. It is a mixture of both stereoisomeric forms. The yield amounts to 8.5 grams of a very hygroscopic product melting at about 90° C.

Example 5

9 grams (6 cc.) of thionyl chloride are added dropwise and with cooling to 20 grams of 1-β-hydroxyethyl-4-diphenyl-methyl-piperidine dissolved in 80 cc. of absolute chloroform, and the mixture is allowed to stand overnight. After removing the solvent, a crystalline residue remains consisting of the hydrochloride of 1-β-chlorethyl-4-diphenyl-methyl-piperidine of the formula

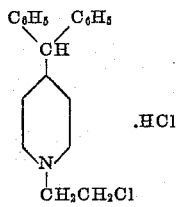

melting at 237–238° C. (acetone); yield=17.5 grams.

The 1-β-hydroxyethyl-4-diphenylmethyl-piperidine used as starting material can be obtained, for example, by reacting 4 grams of ethylene oxide with a solution of 15.1 grams of 4-diphenyl-methyl-piperidine in 80 cc. of alcohol for 24 hours at 20° C. Boiling point=214–220° C. under 0.09 mm. of pressure; yield=15 grams.

*Example 6*

8 grams (5 cc.) of thionyl chloride are added dropwise to 18 grams of 1-β-hydroxyethyl-3-diphenyl-methyl-piperidine dissolved in 100 cc. of absolute chloroform, and the whole is allowed to stand for 24 hours at 20° C. After removing the solvent, a crystalline residue remains consisting of the hydrochloride of 1-β-chlorethyl-3-diphenylmethyl-piperidine of the formula

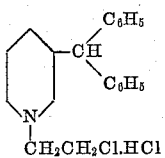

in the form of very hygroscopic crystals melting at about 88° C. Yield=17 grams.

The 1-β-hydroxyethyl-3-diphenyl-methyl-piperidine used as starting material can be obtained by adding 13 grams of ethylene oxide to 50 grams of 3-diphenyl-methyl-piperidine in 120 cc. of alcohol. Boiling point=190–196° C. under 0.15 mm. of pressure. Yield=50 grams.

*Example 7*

33 grams (=7.9 cc.) of thionyl chloride are slowly added dropwise, while cooling, to 33 grams of 1-β-hydroxyethyl-2-diphenylmethyl-piperidine hydrochloride, dissolved in 120 cc. of absolute ethyl acetate or acetone. The temperature is kept at 60° C. for a further 30 minutes, while stirring the solution. The mixture is then evaporated to dryness in vacuo, and the residue is recrystallized from acetone. The hydrochloride of 1-β-chloroethyl-2-diphenylmethyl-piperidine melts at 173–174° C.

What is claimed is:

1. 1-(β-hydroxyethyl)-diphenylmethyl-piperidines of the formula

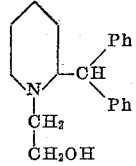

wherein Ph represents a member of the group consisting of unsubstituted phenyl, lower alkyl-phenyl, lower alkoxy-phenyl and halogeno-phenyl.

2. 1-(β-hydroxyethyl)-2-diphenylmethyl-piperidine.

3. 1-(β-hydroxyethyl)-2-(phenyl-para-chloro-phenyl-methyl)-piperidine.

4. Diphenylmethyl-piperidines of the formula

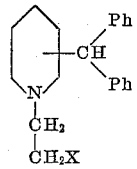

wherein X stands for halogen and Ph represents a member of the group consisting of unsubstituted phenyl, lower alkyl-phenyl, lower alkoxy-phenyl and halogeno-phenyl.

5. 1-(β-chlorethyl)-2-diphenylmethyl-piperidine.

6. 1(β-chlorethyl)-2-(phenyl-para-chlorophenyl-methyl)-piperidine.

7. Non-toxic acid addition salts of the compounds claimed in claim 1.

8. Non-toxic acid addition salts of the compound claimed in claim 2.

9. Non-toxic acid addition salts of the compounds claimed in claim 4.

References Cited in the file of this patent

UNITED STATES PATENTS

| 2,599,364 | Berger et al. | June 3, 1952 |
| 2,891,066 | Parcell | June 16, 1959 |

FOREIGN PATENTS

| 756,713 | Great Britain | Sept. 5, 1956 |

UNITED STATES PATENT OFFICE
CERTIFICATE OF CORRECTION

Patent No. 3,048,594                  August 7, 1962

Karl Hoffmann et al.

It is hereby certified that error appears in the above numbered patent requiring correction and that the said Letters Patent should read as corrected below.

Column 4, line 5, before "-diphenylmethyl-" insert -- -2 --; line 33, for "1($\beta$-chlorethyl)-" read -- 1-($\beta$-chlorethyl)- --.

Signed and sealed this 5th day of May 1964.

(SEAL)
Attest:

ERNEST W. SWIDER                  EDWARD J. BRENNER

Attesting Officer                  Commissioner of Patents